3,041,234
METALLIC SULFIDE PIGMENT

George Bosworth Taylor, Collinsville, Ill., assignor to The Glidden Company, Cleveland, Ohio, a corporation of Ohio
No Drawing. Filed Dec. 30, 1958, Ser. No. 783,695
4 Claims. (Cl. 162—160)

This invention concerns a novel metallic sulfide pigment composition and it concerns more specifically a metallic sulfide pigment composition and a process for the manufacture of paper and equivalent products wherein said metallic sulfide pigment composition(s) is employed. My invention will be understood more fully from a discussion below of certain steps in the manufacture of paper and of the scope of the pigmentary materials employed in such manufacture.

Lithopone, which chemically is a mixture of zinc sulfide and barium sulfate in various proportions, zinc sulfide pigments, and other light colored sulfide pigments such as cadmium sulfide or cadmium lithopone, have in recent years had only limited practical application in certain industries, including the paper industry because the sulfide contained in the pigment is reactive with certain metals. For example, in the paper industry in one or more steps of the processing, if a metallic sulfide pigment is added, the sulfide in the paper stock later on will react with copper or other surfaces, e.g. the copper surfaces used in the process machinery, to give a dark brown copper sulfide which, in turn, stains or discolors the paper. Or, once the paper is coated or filled with a sulfide pigment, and for some reason is rewetted when in contact with copper or silver objects—such as when the said paper is used as a wrapping or part of a container for the object—not only is the paper stained by the copper or silver sulfide then formed, but the copper or silver object is also tarnished by the sulfide. These known adverse effects that a sulfide-containing pigment is capable of are objectionable for obvious reasons.

An object of my invention is to inhibit the formation of dark colored sulfides of heavy metals, such as copper or silver, when such metals are in contact with paper or paper stock containing metallic sulfide pigments.

An ancillary object of my invention is the provision of a process for the manufacture of paper and the like products said process including the addition of a novel metallic sulfide pigment composition in one or more steps of said process.

A more specific object of my invention is the provision of a novel composition of matter adaptable for employment as a pigment in paper manufacture and comprising a metallic sulfide as the pigment and a small amount of a tarnish inhibiting agent.

I have found that by employing a composition of matter comprising a metallic sulfide pigment and chemical agents preferably a combination, said combination being an admixture of thiourea or lower alkyl thioureas and a water-soluble salt of thiocyanic acid with the sulfide pigment, I can substantially inhibit the formation of unwanted heavy metal sulfides such as those of copper or silver by adding minor amounts of said chemical agents to the sulfide pigment used in paper, or paper stock or paper coatings. The compositions of matter adaptable to be employed in the manufacture of paper are also believed to be novel.

In the manufacture of paper there is involved the treatment of wood fibers by processes which include pulping, bleaching, refining and coating, etc. The reagents used in the several process steps and the operations required need not be described here even though, as will be seen hereinafter, my invention contemplates the addition of further chemical substances, e.g. pigments, to one or more steps in the process. The addition of such pigments, for example, zinc lithopone to paper coating composition or to the paper as a filler such as in the case of wall paper and the like, is desirable since certain properties of the paper are improved, altered, or influenced in some beneficial manner by said pigments.

In general, in paper manufacture, wood fibers are pulped and bleached, and then put through a step called beating, sometimes called stock preparation. Here the fibers are treated to prepare them for the various types and grades of paper for which they will be used. In the beater step, materials are added to the pulp, for example rosin soap to impart water resistance to the fibers, starch or certain gums for strength, fillers of the type of clay for opacity, dyestuffs for color and alum for the adjustment of pH and to assist in better reduction of the additives in the sheet. Pigments can also be added at or during this step of the process. As a matter of fact, I contemplate the addition of metallic sulfide pigments in conjunction with the tarnish inhibiting agents of my invention at this point. The pigments can be such as lithopone, cadmium sulfide, etc. Thereafter the stock is processed, by the formation of wet sheets, removal of water by heat, pressing, etc.

In the manufacture of paper, the paper material can also be coated according to known methods. In the coating step, pigments such as clay, precipitated chalk, satin white, blanc fixe, etc. can be used and adhesives including glue, casein, soybean protein, starch, polyvinyl alcohols etc. can also be added. Aqueous mixtures comprising the foregoing ingredients and constituting the adhesive and pigment mixture are frequently used for coating paper in industry.

I also contemplate the addition of the novel pigment compositions of my invention at or during this coating step of the manufacture of paper and the like.

The metallic sulfide pigments that are applicable herein include lithopone (zinc sulfide-barium sulfate), cadmium sulfide, cadmium sulfide-barium sulfate, mercury-cadmium sulfide pigments as described in British Patent 791,098 and in U.S. Patent 2,850,400. Thus, any sulfide-containing pigment which is capable of forming sulfides with the heavy metals such as copper and silver thereby having an adverse affect on products, e.g. paper, can be employed in accordance with the teachings of this invention.

The thioureas which can be employed as tarnish inhibiting agents in the sulfide-containing pigment compositions of this invention can be selected from the lower alkyl thioureas e.g. ethyl, diethyl, propyl, dipropyl, isopropyl and di-isopropyl; also S-alkyl-pseudo-thioureas. Thiourea itself is perhaps the only one which is economically feasible at present, however.

Broadly, my invention contemplates adding a combination of thiourea or a lower alkyl thereof and a water-soluble thiocyanate to a sulfide-containing pigment for the purpose of substantially inhibiting the formation of unwanted tarnish, stains, etc., on the products to which the composition containing the pigments is applied.

More specifically, I have found that when I add .01 to 2.0% by weight of thiourea to ordinary lithopone, or when I add this amount of thiourea plus .01 to 2.0% by weight of a thiocyanate such as ammonium, sodium, or potassium thiocyanate that is, a water-soluble thiocyanate to lithopone, that the water-wetted lithopone as such or in paper composition is scarcely discolored when in contact with copper metal. It is necessary when using the pigment composition in paper making that the thiocyanate salts be water soluble. In addition to these ingredients, I have found that if I add a small amount of a sodium (or other alkali metal) polyphosphate to a beater pulp composition, I overcome effectively a dispersing problem. Also, discoloration of the beater pulp is prevented when the thiocyanate comes in contact with a high iron content alum.

From the above description of my invention, it will be understood that I can accomplish the purposes and objections thereof by:

(1) The addition of thiourea, or a lower alkyl thereof, to a sulfide containing pigment such as zinc sulfide, lithopone, cadmium sulfide and cadmium lithopone to inhibit the formation of dark (colored) sulfides of heavy metals such as copper or silver when such metals or compounds of same come in contact with wet slurries or coating compositions containing said pigment, or when such metals are in contact with dried coatings containing said pigment under moist conditions.

(2) The addition of thiourea or a lower alkyl thereof to a sulfide containing pigment in combination with a thiocyanate (such as sodium, potassium, ammonium, etc.) for the purposes enumerated in (1) above, where the combination has sulfide stain resistance properties superior to either ingredient or chemical agent alone. The combination of small quantities of thiourea and thiocyanate salt is best when used in the paper industry as a part of a paper coating or as a pigment in the paper beater pulp. Tetrasodium pyrophosphate can be added, as noted, as a dispersant in beater pulp compositions and elsewhere where dispersing problems are presnt or discoloration due to iron compounds.

Although the most effective amounts of ingredients that can be used as inhibitors range from .01 to 2% for thiourea based on ordinary lithopone and from 0.01 to 2% of thiocyanate these components can vary without departing from the scope of this invention. A specific example of a workable composition which I have prepared includes 0.5% ammonium thiocyanate, 0.25% thiourea and 0.30% tetrasodium pyrophosphoric.

The following are further specific examples of the compositions and method of this invention.

EXAMPLE 1

(A) To 49¾ lbs. of ordinary lithopone (28–30% zinc sulfide, 70–72% barium sulfate), there was added ¼ lb. of thiourea and the ingredients thoroughly mixed. The so prepared mixture can be employed in paper making.

(B) Another composition was prepared by adding to 49⅝ lbs. of ordinary lithopone, ⅓ lb. of thiourea and ¼ lb. ammonium thiocyanate and the ingredients thoroughly mixed. It does not matter when these chemicals are added to the lithopone. They can be added either before the lithopone slurry is dried during its manufacturing process, after it is dried (but preferably ahead of dry grinding to obtain an intimate mix), or in the final user's plant as he is adding the lithopone to this recipe.

EXAMPLE 2

This example demonstrates the method of testing the treated lithopone, i.e. the sulfide pigment containing the inhibitors of this invention. A series of laboratory tests were devised to test the treatment for the paper indusry.

(1) A prototype paper coating mix was prepared and tested in two ways:

The paper mix.—To 80 grams of treated lithopone prepared as in Example 1A or B, 35 grams water were added and also ¼ gram tetrasodium pyrophosphate. The material was then mixed for ½ hour. To this mixture there was then added 48 grams of "size" prepared as in the following formula:

60 grams Soya protein (or casein)
231 cc. water
.6 gram tributyl phosphate
9.4 cc. 28% ammonium hydroxide The above paper mixture was then tested in two ways:
(A) By applying a film of this coating on paper and thoroughly drying. The paper was then wetted and layed flat on a clean glass plate. A bright penny was then placed on the surface and the whole was covered to prevent moisture evaporation. After 16 hours, the penny was examined for tarnish and the paper for stain.

(B) The second test was to take 2 cc. of the wet coating and mix into it a given weight of fine copper powder. This mixture was then left to stand in the depression of a spot plate while stirring occasionally. The deepening of the color of the mix was then observed at stated intervals.

(2) To simulate "beater pulp" conditions another mixture was made:

To 80 grams of treated lithopone prepared as in Example 1A or B, there was added 35 cc. of water and ¼ gram tetrasodium pyrophosphate. This mixture was then stirred and acidified with commercial paper makers alum to a pH of 4.0. The copper powder test described under (B) above was then run on this acid slurry.

The results from the above tests were given a numerical rating where 10 was perfect (no tarnish or stain) and 0 was the worst result obtained in the series. A typical set of results is shown in the table below.

Table 1

|  | Test 1-A | | Test 1-B—Discoloration of alkaline coating | | Test 2-B—Discoloration of acid slurry | |
| --- | --- | --- | --- | --- | --- | --- |
|  | Stain on paper 16 hrs. | Stain on penny, 16 hrs. | 1 hr. | 16 hrs. | ½ hr. | 3 hrs. |
| TiO₂-clay (sole pigments, no sulfide present) | 8 | 5–8 | 10– | 7 | -------- | -------- |
| Untreated lithopone | 0 | 5 | 5 | 0 | 2 | 0 |
| Lithopone + thiourea | 3 | 0 | 9 | 7 | 9 | 6 |
| Lithopone + NH₄CNS and thiourea | 9 | 9 | 10– | 8 | 10– | 7 |

Although my invention has been described with relation to certain specific materials, equivalent materials to thiourea as noted, would include the simple alkyl modified thioureas while any water-soluble salt of thiocyanic acid in combination with thiourea, as above described, would be operable.

By the compositions described above, I have been able to make it possible to employ sulfide-containing pigments in the manufacture of paper and the like. The compositions, however, can be used wherever the problem of tarnish and stain formation, by virtue of the employment of sulfides, is prevalent.

Resort can be had to modifications and equivalents falling within the spirit of this invention and the scope of the appended claims.

Having thus described my invention I hereby claim:

1. In a paper manufacturing process wherein a sulfide pigment composition is added to aqueous material in at least one stage of the process, the improvement which comprises employing as said pigment composition a pigmentary metallic sulfide containing 0.01–2% by weight of a water soluble salt of thiocyanic acid and 0.01–2% by weight of a thiourea selected from the group consisting of thiourea and lower alkyl thioureas.

2. The process of claim 1 wherein said sulfide pigment composition contains an alkali metal polyphosphate, about 0.25% of thiourea, and about 0.5% of a water soluble thiocyanate.

3. A stain-resistant pigment for aqueous systems comprising a pigmentary metallic sulfide, 0.01–2% by weight of a water soluble salt of thiocyanic acid, and 0.01–2% by weight of a thiourea selected from the group consisting of thiourea and lower alkyl thioureas.

4. The pigment of claim 3 wherein the pigmentary metallic sulfide is lithopone, and there is present an alkali metal polyphosphate, about 0.25% of thiourea, and about 0.5% by weight of a water soluble thiocyanate.

References Cited in the file of this patent

UNITED STATES PATENTS

| | | |
|---|---|---|
| 2,058,111 | Stutz | Oct. 20, 1936 |
| 2,178,334 | Booge | Oct. 31, 1939 |
| 2,187,130 | Light Body | Jan. 16, 1940 |
| 2,194,479 | Mowlds | Mar. 26, 1940 |
| 2,195,117 | Mowlds | Mar. 26, 1940 |
| 2,877,085 | George | Mar. 10, 1959 |
| 2,907,716 | Wasserman | Oct. 6, 1959 |